Aug. 16, 1966 S. S. WULC 3,267,334

MODULAR CIRCUIT ASSEMBLY

Filed March 14, 1962

INVENTOR

Stanley S. Wulc

BY Paris, Haskell and Levine

ATTORNEYS

United States Patent Office 3,267,334

Patented August 16, 1966

3,267,334

MODULAR CIRCUIT ASSEMBLY

Stanley S. Wulc, Lafayette Hill, Pa., assignor, by mesne assignments, to United Aircraft Corporation, a corporation of Delaware Filed Mar. 14, 1962, Ser. No. 179,695
8 Claims. (Cl. 317—101)

The invention generally relates to improvements in electrical connectors, and more particularly to improved electric connectors that are intimately combined with electronic circuitry in miniaturized circuit housings to provide detachable electrical connection between the assembled housings and external sources or loads.

This invention is particularly concerned with the packaging and electrical interconnection of individually functionable miniature electronic circuits, such as amplifiers or oscillators and the like, in such manner that each individual circuit is provided within a separate housing module and a plurality of such modules are interchangeably assembleable in different system arrangements to synthesize different electronic systems. According to the invention the modules are constructed to both mechanically and electrically interengage in a self-supporting serial array without the need for a chassis or terminal board common to all modules as is customary in most known plug-in types of modular circuit assemblies.

In an earlier application of the same inventor, Serial No. 855,406, now Patent 3,029,368, there is provided a miniaturized modular housing construction and assembly of this general type wherein separate electrical connections may be made to each different one of the modules in the assembled array from external sources or loads indepently of electrical connection with the circuits of other modules. This is performed by providing a unique arrangement of electrical conductor means for each module, including either elongated wires or electrical connectors, which conductor means are disposed to pass through the interior of each one of the housing modules preceding the selected module, and thereby pass through the interior of all preceding modules in the assembled array in succession without electrical interference with the circuitry within.

According to the present invention, there is provided a modular construction of similar versatility, but embodying a novel multiterminal electrical connector for each module for performing this function. The electrical connector means of the present invention provides for the transmission of separate electrical signals to and from each module to an independent external source or load by detachable electrical connections made through the interior of preceding modules. Thus a plurality of modules may be interchangeable assembled in serial array but may be individually energized electrically by separate external signals, or may be energized in parallel, or in cascade, or by any desired combination thereof as desired. According to further feautres of the invention the novel construction of the modules and of the electrical connectors permits improvements in miniaturization of the electrical circuitry whereby the systems are particularly adapted for aircraft use or for other portable application where considerations of reduced size and lightweight are important.

It is accordingly an object of the invention to provide a modular circuit housing and combined electrical connector that is smaller, lighter in weight, and otherwise more efficient with lesss unused space than known devices.

A further object is to provide a system of such modules having detachable electrical interconnection means for enabling the assembled modules to be separately energized by different signals from a plurality of external signal sources, or to be energized in parallel, or in cascade, or by any combination thereof.

Another object is to provide such a housing construction and assembly means that permits electrical connections to be made to and from any one of the assembled modules in the array without electrical connection to the circuits of the other modules.

A still further object is to provide such a modular circuit construction that may be assembled in either odd or even number stacks and permitting separate electrical connections to be made to and from the individual units.

Other objects and many additional advantages will be more readily understood by those skilled in the art after a detailed consideration of the following specification, taken with the accompanying drawings, wherein.

Figures 1, 2, 3, 4:
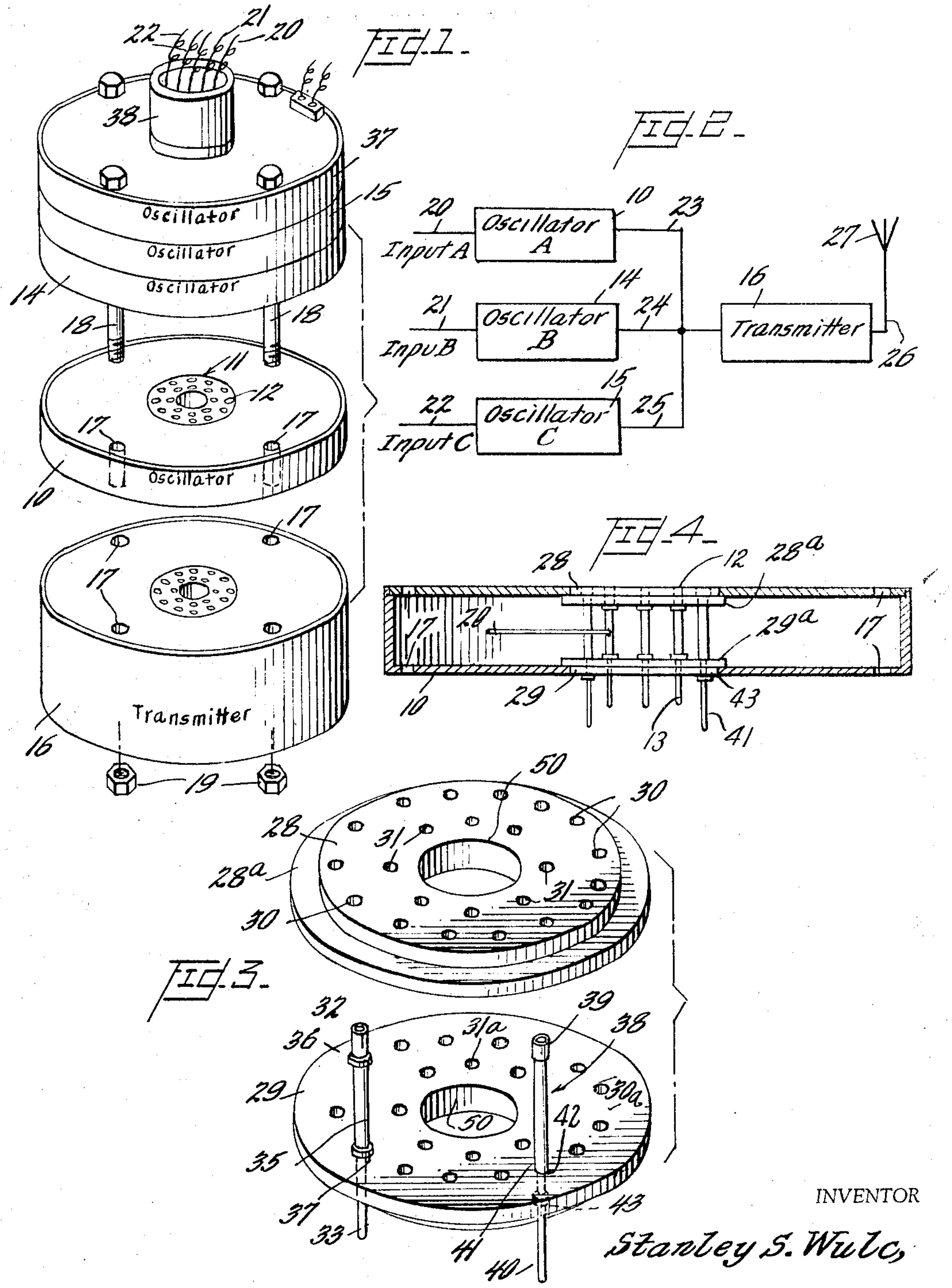
FIG. 1 is a perspective view generally illustrating the outer construction of the modules and their manner of interassembly.
FIG. 2 is an electrical block diagram representing a typical radio telemetering system that may be embodied in the modular construction of the invention.
FIGURE 3 is an enlarged perspective view illustrating details of the preferred electrical connector of the present invention.
FIGURE 4 is a cross-sectional view of the preferred modular housing incorporating the electrical connector of FIG. 3.

Refering now to the drawing, there is generally shown in FIG. 1 the preferred outer construction of the modular housings and connectors according to the invention and the manner of interchangeably assembling a series of such modules in a self-supporting cascaded arrangements to synthesize an electrical system. As shown each of the modules is in the form of a thin wafer or pancake shaped hollow housing, such as 10, 14, and 15, having a transverse dimension much greater than its thickness. Within each housing is provided the electrical components of an independently functioning miniaturized electrical circuit such as an amplifier, oscillator, transmitter or the like, providing one subcircuit of a complete electrical system.

Each of the modules 10 is provided with a novel multiterminal electrical connector means, indicated at 11, and located centrally of the module, and having a series of female terminals 12 accessible from the upper surface of the module and a corresponding series of male protruding terminals 13 accessible from the underside of the module whereby each terminal of the connector provides an electrical conductor extending transversely through the interior of the module. When stacking the modules in the serial or cascaded assembly shown in FIG. 1, each of the male terminals projecting from the underside of each preceding module enters into the corresponding female receptor terminals of the next module whereby a series of independent electrical conductors are provided interiorly through all the assembled modules corresponding in the number of separate circuits being provided to the number of terminals of the connectors 11.

For mechanically fastening the housing modules together in the serial arrangement shown, a number of different type fastening means may be employed, but it is preferred to provide a series of openings such as 17, through each module with the openings through all modules being in alignment when the modules are assembled. An elongated bolt 18 is then passed through each series of aligned openings 17 in the stacked array of modules and fastened at the opposite end with a threaded nut 19 as shown to rigidly maintain the individual modules in the array joined together as shown.

According to the invention, the multiple terminal connector means 11 for each module contains a sufficient number of terminals to enable allocating at least one different terminal of each connector to each of the modules in the stacked array for the purpose of making a separate electrical connection to each module independently of the others. For example, presupposing that the third terminal in the connectors 11 of all modules is allocated or reserved exclusively for module 10. In this instance, the third terminal in the connectors of all other modules such as modules 15, and 14 is in effect a "dummy" terminal that is not connected to the circuit of any of the modules other than module 10 but merely provides an electrical conductor passing through the interior of such other modules. Consequently, when the modules are serially assembled as in FIG. 2, an external electrical connection made to the third terminal of the uppermost housing 37 by means of a suitable connector plug 38, passes an electrical signal through the interengaged third terminals of all modules preceding module 10 thereby making an independent electrical connection between module 10 and the external connector plug 38. Similarly other of the terminals of each connector 11 are reserved for the exclusive use of each different other one of the modules and are accordingly "dummy" terminals or electrical conductors for all modules other than the one previously selected. In this manner, each one of the modules 10, 14, 15, 37, and the like may be separately connected to a different external cable such as 20, 21, or 22 independently of the others by means of the series of electrical conductors passing through the "dummy" terminals of each one of the preceding modules.

The advantages and versatility of this arrangement became obvious when considering the electrical connections necessary to synthesize a radio telemetering system as generally shown in FIG. 2. In this system, the modules 10, 14, and 15 each contain a complete sub-carrier oscillator circuit operating at a different frequency from the others. Each subcarrier oscillator is adapted to be separately modulated by a different modulating signal introduced over a separate input line 20, 21, and 22, respectively. These input signals are each obtained from a separate external source, that in a radio telemetering system would most generally be a separate transducer for detecting a different one of such external conditions as temperature, speed, and the like. The modulated output signals from the subcarrier oscillators being produced over output lines 23, 24, and 25, respectively, are suitablely mixed or combined in common to energize the radio transmiter modules 16, which as shown in FIG. 1, may be made somewhat thicker in depth than the other modules in the array to accommodate the power handling transistors in the radio transmitter stage 16. The output of the transmiter module 16 produced over line 26 is then directed to energize an antenna 27 for transmitting the radio frequency signal.

By this arrangement of interconnections, it is evident that any reasonable number of the modules may also be interchangeably assembled with a greater or fewer number of telemetering channels, since if any module, such as module 10, is eliminated from the array, the connector terminal allocated for that frequency is merely a "dummy" or "floating" terminal in all the remaining modules and does not provide an electrical connection to any of the other circuits.

The common output connection of the modules in FIG. 2 to energize the transmitter module 16 is also quite easily performed by merely using a common one of the connector terminals in each of modules 10, 14, and 15 as the output. For example, the sixth connector terminal in each of modules 10, 14 and 15 may be allocated for making connection to the input of the transmitter module 16, and the output lines 23, 24, and 25 within each of modules 10, 14, and 15, respectively, may be interiorly connected to the sixth terminal of the connector 11 of that module. Thus when the modules are serially assembled as in FIG. 1, they are each separately energized by a different transducer signal from the input cable 38 but their output signals of the modules are directed to a common terminal to energize the transmitter module 16. As previously mentioned, the removal or addition of any one or more of the oscillator modules from the assembly to add or delete certain telemetering channels from the system does not affect the operation of the remaining channels but merely varies the number of serially connected "dummy" conductors and the number of channels energizing the transmitter module 16. Thus the electrical connector means of the present invention provides an extremely versatile system for interchangeably assembling the modular units in any of a number of desired systems.

Referring to FIG. 3 for details of the connectors 11, each of the preferred multiterminal connectors 11 preferably comprises a generally circular disc shaped upper insulator member 28 and a similar lower insulator member 29, with the members 28 and 29 being spaced from one another by about the thickness of the housing module, as shown in FIG. 4. The upper insulator 28 is provided with a first outer series of spaced openings 30 passing therethrough and disposed about the outer periphery of the insulator disc 28 and a second series of spaced openings 31 therethrough disposed in a circular outline centrally of the first series and substantially coaxially therewith. In the lower insulator 29 there is provided a similar first and second series of openings 30*a* and 31*a*, with each opening in the lower insulator 29 being in alignment with a corresponding opening in the upper isulator 29 when the insulators 28 and 29 are properly placed one above the other as shown.

The individual terminals 35 of these connectors each comprise an upper hollow cylindrical female receptor part 32 that passes through the opening 30 or 31 provided in the upper insulator 28 and terminates at about the upper surface thereof, and a lower solid cylindrical male extension part 33 that passes through the corresponding opening 30*a* or 31*a* of the lower insulator 29 and projects for a short distance beyond the lower surface of the insulator 29. A central shaft part of the terminal interconnects the upper and lower connector parts of each terminal and is provided with an upper flange 36 and lower flange 37 for bearing against the confronting surfaces of both insulators 28 and 29 serving to prevent any axial movement of the terminal 35 between the insulators 28 and 29 and to accurately maintain the spacing of the insulators 28 and 29 apart from one another.

In addition to the plurality of electrical terminals 35, the connectors 11 also include two or more locator pins, such as 38, that are asymmetrically positioned with respect to the terminals 35 to insure that the connectors 11 of all modules mate with one another in only one given predetermined arrangement. The locator pins 38 also include a female receptor part 39 that passes through an opening 30 or 31 in the upper insulator 28 and terminates at the upper surface, and a lower male insertion part 40 that projects through an opening 30*a* or 31*a* in the lower insulator 29 and extends for a distance beyond the distance of projection of the terminals 33. The female receptor part 39 and male insertion part 40 are adapted to interengage with corresponding locator pins 38 in preceding and succeeding modules in the same manner as do the electrical terminals 35 and since the male insertion part 40 of the locator pins projects beyond that of the terminals, it is required that adjoining modules be properly placed with respect to each other before the locator pins and electrical connectors thereof will interengage. This insures that the terminals of each module can make contact only with the correspondingly correct terminals of the other modules.

The shank portion 41 of the locator pins 38 are constructed somewhat differently from that of the terminals 35 to perform the additional function of fastening the two insulator parts 28 and 29 together. As generally shown, the shank portion 41 of the locator pins is formed of somewhat greater diameter than the openings 30*a* and 31*a* in the lower insulator 29, thereby forming a shoulder or stop 42 against the lower insulator 29 on one side thereof. On the other side of the lower insulator 29, the male portion 40 is provided with a small groove or necked portion to accommodate a snap ring 43. Thus the shoulder portion 42 and the snap ring 43 lock the locator pin to the lower insulator 29. For fastening the pin 38 to the upper insulator 28, the female portion 39 of the pin is made larger than the shank part 41 and fits into a countersunk opening 30 or 31 in the upper insulator (not shown), and thereby to form an upper shoulder and stop. This urges the upper insulator 28 down against the flange 36, of the terminals 35. After applying the split ring 43 to the locator pins, therefore, the upper and lower insulators 28 and 29 are rigidly assembled, making each connector 11 an assembled self-supporting unit that may be fitted into a suitable hub opening provided in the modular housing as shown in FIG. 4.

Referring to FIG. 4 for details of the assembly of the electrical connector 11 and housing, it is noted that each of the upper and lower insulators 28 and 29 of the connector 11 is provided with a flanged portion **28*a* and 29*a*, respectively. The lower flange 29*a* is adapted to bear against the lower wall of the housing about the central hub opening therein, permitting the lower surface of the insulator 29 to be flush with the lower outside wall, as shown. The upper surface of the upper insulator 28**, in turn, is likewise adapted to be substantially flush with the upper surface of the housing.

In a preferred embodiment the hollow housing and circuit therein is filled with a potting compound for sealing the electrical components therein and there is provided an upper plate or cover that is suitably fastened in place to close the upper surface of the housing.

As mentioned above, the locator pins 38 are provided with a lower male insertion part 40 that projects beyond the corresponding male part of the terminals 35 to insure that each of the connectors mates properly in only one given arrangement with the next. For ease in properly positioning the adjoining modules prior to interconnection of the connectors 11, the locator pins 38 are preferably also made visibly distinguishable in appearance and coloring from the terminals 35. According to one preferred embodiment, the locator pins 38 are plated with a metal having a different color than the terminals 35. Consequently, each connector 11 may be initially oriented properly with respect to the next by visually aligning the distinguishable locator pins, and after such alignment, that connector 11 may be easily inserted or plugged into the next, as is desired.

Although but preferred embodiments of the invention have been illustrated and described, it is believed evident that many changes may be made by those skilled in the art without departing from the spirit and scope of the invention. Accordingly this invention is to be considered as limited only by the following claims.

What is claimed is:

1. A modular circuit assembly comprising:

a plurality of miniature circuit housing modules interchangeably mateable with one another mechanically in a self-supporting stacked serial array independently of a supporting rack or panel board, each circuit housing module containing the electrical components of a separately functioning electrical circuit, such as an amplifier, oscillator, transmitter or the like, and with the assembled modules providing a substantially complete multicircuit electrical system, the circuit in each of the modules having a separate and independent signal line, and the signal lines of the different modules each being independently electrically connectable to a different one of a plurality of external signal sources or loads, a plurality of electrical signal conductor means for providing the separate electrical connection between the electrical signal line of each different module and the related one of the different external signal sources or loads, said electrical conductor means comprising for each module a multiple terminal connector means having a plurality of electrical terminals that are insulated from one another, with at least one different electrical terminal being allocated for detachable interconnection between a different one of the external sources or loads and a different one of the modules of the completed assembly, each of said terminals having a female portion accessible from one side of the module for detachable engagement with a corresponding terminal from a preceding module and having a male portion accessible from another side of the module for detachable engagement with a corresponding terminal disposed on a succeeding module, and each terminal having a conducting portion interconnecting said male and female portions and extending through the interior of that module, means for electrically interconnecting the signal line of each module with a different one of said terminals in the connector means, and locator means for each connector for enabling the detachable engagement of the individual terminals thereof in only one given arrangement with the connector of the preceding module and the connector of the succeeding module in the assembly.

2. In a modular circuit assembly comprised of a plurality of miniature wafer-shaped housings, each containing a functionally independent electrical circuit, with the housings being interchangeably assembleable in a self-supporting serial array:

multiple circuit electrical connector means for each housing for electrically connecting the circuits of each housing with those of preceding and succeeding housings in the array and providing separate electrical connections to the independent circuit of each housing in the array independently of electrical connection with the circuits of the preceding and succeeding housings, said connector means for each housing comprising a miniature unit extending transversely through the interior of the wafer housing and having a plurality of conductors insulated from one another with at least one conductor being allocated for each different housing in the array, each conductor having an upper and a lower engageable portion accessible from opposite sides of the housing for detachable engagement with corresponding portions of the conductors of preceding and succeeding housings, each said connector means being provided with locator means having portions accessible from opposite sides of the housing for detachable engagement with corresponding locator means of preceding and succeeding housings to enable interengagement of the multiple circuit connectors in only one given arrangement, means interiorly within each housing making electrical connection between the circuit in each housing and a different one of the conductors, and a multiple terminal cable connector detachably engageable with the multiple terminal connector means of the last housing in the serial array and having a different conductor of the cable connected to each terminal thereof for providing separate electrical circuit connections to each of the assembled housings.

3. A modular circuit assembly comprising:

a plurality of thin wafer-shaped housings detachably assembleable in a series array, each housing having a transverse dimension much greater than its axial thickness and having upper and lower substantially coplanar surfaces adapted to mate with corresponding lower and upper surfaces, respectively, of preceding and succeeding housings to provide a substantially self-supported array, each housing having a multiconductor electrical connector means extending axially through the thickness of the housing and having male and female connector parts for each conductor that are accessible from the upper and lower surfaces of the housings respectively for detachable engagement with complementary connector parts of preceding and succeeding housings, each connector means having said conductors insulated from one another and with at least one different conductor in each connector being allocated for an independent circuit to a different housing in the array, and an end cable multiple circuit connector for the array for engagement with the connector means of the last housing in the array, said end cable connector having a separate conductor of the cable for each different conductor of the multiple connectors for providing independent electrical connections between each cable conductor and each different one of the circuits in the assembled housings.

4. A multiple terminal electrical connector for miniature wafer-shaped hollow housings comprising:

an upper insulator and lower insulator member spaced apart from one another by about the distance between the upper surface and lower surface of the wafer housing whereby the upper and lower surfaces of the insulator provide portions of the upper and lower surfaces of the housing, a plurality of electrical connector pins supported in spaced arrangement by and between said insulators, each of said pins having a female connector portion projecting through an opening in the upper insulator and exteriorly accessible from the upper surface of the housing, each pin having a male inserter portion projecting through an opening in the lower insulator and projecting beyond the lower surface of the housing, each said pin having an intermediate portion interconnecting said upper and lower portion and provided with flanges bearing in opposition against the upper and lower insulators to prevent axial movement of the pin therebetween, a plurality of locator pins disposed in asymmetrical spaced relation, said locator pins projecting through said upper and lower insulators and having flanged portions bearing against the upper and lower insulators, each of said locator pins having a female portion accessible from the upper surface of the housing and a male portion accessible from the lower surface of the housing, and locking means for said locator pins to maintain said upper and lower insulators fastened together.

5. A multiconductor plug-in connector unit for electrical circuit housing modules comprising: a pair of substantially parallel arranged insulator plates adapted to be supported in the housing module, a plurality of substantially rigid conductors passing through openings in said plates and spaced apart from one another, each conductor having a male terminal portion at one end and a female portion at the opposite end, flange means on said conductors for maintaining said plates in predetermined spaced apart arrangement, and means for fastening said plates in said arrangement to prevent separation of said conductors, said means comprising a second plurality of rigid conductors passing through openings in said plates and having flange means bearing against said plates, and locking means on said second conductors for retaining said plates to said second conductors.

6. In a system of the type described, a plurality of modular circuit housings interchangeably interconnectable in serial array, a plug-in connector unit for each module having a total number of conductors corresponding to the total number of modules, one different conductor in the connector of each module being reserved exclusively for that module and the other conductors of said connector being each reserved for different ones of the other modules in the array, whereby when the plurality of modules are serially interconnected a plurality of separate and independent electrical circuits are provided through the array with a different circuit for each module, each said connector unit comprising a plurality of substantially rigid conductors, each having a male terminal portion at one end and a female portion at the other end, and an insulating member for supporting said substantially rigid conductors, each said connector unit being larger than the thickness of its associated module and having said male and female terminal portions extending from opposite sides of the module.

7. A modular circuit assembly comprised of a plurality of miniature wafer-shaped housings having substantially planar upper and lower surfaces thereof, with the housings being detachably assembleable in a self-supporting serial array:

multiple terminal electrical connector means for each housing intermediate the end housings of the array for providing detachable electrical interengagement with preceding and succeeding housings, each said connector means having a plurality of insulated terminals with at least one different terminal being provided for each different housing in the array, said electrical connector means extending transversely through the housing whereby each terminal thereof is accessible from opposite sides of the housing, said terminals comprising a plurality of parallel disposed conductors having a male engaging portion accessible from one surface of the housing and a female engaging portion accesible from the other side of the housing and an intermediate portion interconnecting the male and female portions and being accessible only to the interior of the housing, an insulator means supported by the housing for maintaining said conductors in parallel alignment, and a multiple terminal end cable connector for detachable engagement with the connector means of the last housing in the array and having a separate electrical conductor connected to each terminal thereof for making independent electrical connection with the circuit of each housing in the array through the detachably connectable terminals of the connector means of each one of the preceding housings in the array, the terminals of each connector means comprising a rectilinear conductor member provided with said female engaging portion at one end, and said male engaging portion at the other end, and a pair of spaced flanges on the intermediate portion interconnecting said ends, a pair of parallel disposed insulators spaced from one another by the distance between the flanges, with one insulator supporting and retaining the female receptor portions of the terminals in given spaced alignment and the other insulator supporting and retaining the male inserter portions in given spaced alignment, said one insulator being supported by the housing with its upper surface substantially coplanar with the upper surface of the housing and the other insulator being supported by the housing with its lower surface substantially coplanar with the lower surface of the housing, and said flanges on each terminal preventing axial movement of that terminal between said pair of supporting insulators.

8. A modular circuit assembly comprised of a plurality of miniature wafer-shaped housings having substantially planar upper and lower surfaces thereof, with the housings being detachably assembleable in a self-supporting serial array:

multiple terminal electrical connector means for each housing intermediate the end housings of the array for providing detachable electrical interengagement with preceding and succeeding housings, each said connector means having a plurality of insulated terminals with at least one different terminal being provided for each different housing in the array, said electrical connector means extending transversely through the housing whereby each terminal thereof is accessible from opposite sides of the housing, said terminals comprising a plurality of parallel disposed conductors having a male engaging portion accessible from one surface of the housing and a female engaging portion accessible from the other side of the housing and an intermediate portion interconnecting the male and female portions and being accessible only to the interior of the housing, an insulator means supported by the housing for maintaining said conductors in parallel alignment, and a multiple terminal end cable connector for detachable engagement with the connector means of the last housing in the array and having a separate electrical conductor connected to each terminal thereof for making independent electrical connection with the circuit of each housing in the array through the detachably connectable terminals of the connector means of each one of the preceding housings in the array, locator means for permitting interconnection of said multiple terminal connector means in only one given arrangement, said locator means comprising a plurality of terminal-like locator members for each connector means and being disposed asymmetrically with respect to said insulators, each said locator member having a female receptor portion at one end and a male insertion portion at the other end, said male insertion portion projecting axially beyond the male insertion portion of the connector terminals, and each said locator member having a receptor portion and inserter portion that are visibly distinguishable in appearance from that of the terminals.

References Cited by the Examiner

UNITED STATES PATENTS

| | | | |
|---|---|---|---|
| Re. 22,028 | 2/1942 | Clark | 339—166 |
| 2,448,339 | 8/1948 | Williams | 339—166 X |
| 2,866,136 | 12/1958 | Coda et al. | 339—17 |
| 2,910,672 | 10/1959 | La Patka | 339—17 |
| 3,029,368 | 4/1962 | Wulc | 339—17 |
| 3,054,024 | 9/1962 | Dillen et al. | 317—101 |
| 3,159,775 | 12/1964 | Ingraham | 29—155.55 |
| 3,184,830 | 5/1965 | Lane et al. | 174—68.5 X |

ROBERT K. SCHAEFER, *Primary Examiner.*

E. JAMES SAX, DARRELL L. CLAY, KATHLEEN H. CLAFFY, *Examiners.*

J. G. COBB, W. C. GARVERT, *Assistant Examiners.*